US 9,242,379 B1

(12) United States Patent
Mosley (10) Patent No.: US 9,242,379 B1
(45) Date of Patent: Jan. 26, 2016

(54) METHODS, SYSTEMS, AND COMPUTER READABLE MEDIA FOR PRODUCING REALISTIC CAMERA MOTION FOR STOP MOTION ANIMATION

(71) Applicant: The Trustees of the University of Pennsylvania, Philadelphia, PA (US)

(72) Inventor: Joshua Peter Mosley, Philadelphia, PA (US)

(73) Assignee: THE TRUSTEES OF THE UNIVERSITY OF PENNYSYLVANIA, Philadelphia, PA (US)

(*) Notice: Subject to any disclaimer, the term of this patent is extended or adjusted under 35 U.S.C. 154(b) by 0 days.

(21) Appl. No.: 14/617,771

(22) Filed: Feb. 9, 2015

(51) Int. Cl.
*H04N 5/225* (2006.01)
*B25J 9/16* (2006.01)
*B25J 19/02* (2006.01)
*H04N 5/222* (2006.01)
*H04N 5/232* (2006.01)
*G06K 9/00* (2006.01)
*G06T 7/20* (2006.01)

(52) U.S. Cl.
CPC .............. *B25J 9/1664* (2013.01); *B25J 9/1679* (2013.01); *B25J 9/1697* (2013.01); *B25J 19/023* (2013.01); *G06K 9/00664* (2013.01); *G06T 7/2033* (2013.01); *H04N 5/2228* (2013.01); *H04N 5/23203* (2013.01); *G06T 2207/30241* (2013.01); *Y10S 901/09* (2013.01)

(58) Field of Classification Search
USPC .................................. 345/473, 474; 348/169
See application file for complete search history.

(56) References Cited

U.S. PATENT DOCUMENTS

| | | | |
|---|---|---|---|
| 5,029,997 A * | 7/1991 | Faroudja | 352/54 |
| 2002/0145660 A1* | 10/2002 | Kanade et al. | 348/36 |
| 2010/0231692 A1* | 9/2010 | Perlman et al. | 348/48 |
| 2011/0211096 A1* | 9/2011 | Aagaard et al. | 348/262 |
| 2014/0344762 A1* | 11/2014 | Grasset et al. | 715/852 |

FOREIGN PATENT DOCUMENTS

WO    WO 2013052383 A1 *    4/2013

OTHER PUBLICATIONS

Priebe, Ken A., "The Advanced Art of Stop-Motion Animation: Visual Effects—Part 2", from Tutorials, Education and Training, Stop-Motion in ANIMATIONWorld posted on Jul. 8, 2011 found on the website http://www.awn.com/animationworld/advanced-art-stop-motion-animation-visual-effects-part-2.*

(Continued)

*Primary Examiner* — Dave Czekaj
*Assistant Examiner* — Tyler W Sullivan
(74) *Attorney, Agent, or Firm* — Jenkins, Wilson, Taylor & Hunt, P.A.

(57) ABSTRACT

The subject matter described herein includes methods, systems, and computer readable media for producing realistic camera motion for stop motion animation. One method includes moving an object in a first space, wherein at least a portion of the movement is effected by human or other living organism. The method further includes tracking motion of the object as the object is moved in the first space and generating corresponding tracked motion data. The method further includes generating, using the tracked motion data, robot control information for controlling a robot to move a physical stop motion animation camera in a stop motion animation set. The method further includes controlling, using the robot control information, the robot to move the stop motion animation camera in the stop motion animation set.

20 Claims, 4 Drawing Sheets

(56) References Cited

OTHER PUBLICATIONS

"Drangonframe User Guide," http://www.dragonframe.com/downloads/Dragonframe%20User%20Guide%20-%20Mac.pdf (Publication Date Unknown, Downloaded from the Internet Feb. 9, 2015).

Persing, "Joshua Mosley's 'Jeu de Paume' Makes The 2014 Whitney Biennial," pp. 1-2 (Mar. 25, 2014).

"Joshua Mosley," Whitney Museum of American Art, pp. 1-2 (Copyright 2014).

"MatchMover User Guide," Autodesk, Inc., http://images.autodesk.com/adsk/files/matchmoveruserguide2011.pdf (2011).

* cited by examiner

FIG. 4 ically.
METHODS, SYSTEMS, AND COMPUTER READABLE MEDIA FOR PRODUCING REALISTIC CAMERA MOTION FOR STOP MOTION ANIMATION

TECHNICAL FIELD

The subject matter described herein relates to stop motion animation. More particularly, the subject matter described herein relates to methods, systems, and computer readable media for producing realistic camera motion for stop motion animation.

BACKGROUND

Stop motion animation is a process where a scene is photographed frame by frame, and objects in the scene are changed between frames so that when the frame images are played back in rapid succession, the objects in the scene appear to be animated continuously. Stop motion animation is used in movies and television. For example, in the film The Empire Strikes Back, stop motion animation was used to animate models of All Terrain Armored Transport (AT-AT) walkers to produce footage of the machines walking across the surface of the fictitious ice planet Hoth.

When capturing images for stop motion animation, it may be desirable in some instances to move the scene acquisition camera around the scene. One example of a situation in which camera movement is needed is when the camera viewpoint represents the viewpoint of a human character or of a camera held by a human character within the scene. If the human is moving in the scene, the camera should also move. If the camera movement is to be realistic, i.e., like a human in this example, the camera movement should emulate human movement. Another example in which moving the stop motion animation camera during scene acquisition is desirable to simulate the viewpoint of a flying object. In The Empire Strikes Back, animators programmed camera movements in software to simulate a camera affixed to flying spaceship, a camera on a crane and dolly, and other types of movements. In order to effect such movements, the programmers defined camera start, end and in some cases intermediate points, and the computer software interpolated between the points. The interpolated camera positions were then used to control robotic motion control rigs to physically move the stop motion animation cameras within the scene.

Existing methods for producing camera motion for stop motion animation may appear synthetic because the result lacks the natural complexity of a motion that is sensed when a camera motion is performed in space with physical beings and physical objects. Humans and moving objects may move in irregular patterns which are difficult to manually program into camera robot motion control systems.

Accordingly, in light of these difficulties and with the interest of creating stop-motion camera performances with specific characteristics of movement, there exists a need for methods, systems, and compute readable media for producing realistic camera motion for stop motion animation.

SUMMARY

The subject matter described herein includes methods, systems, and computer readable media for producing realistic camera motion for stop motion animation. One method includes moving an object in a first space, wherein at least a portion of the movement is effected by human or other living organism. The method further includes tracking motion of the object as the object is moved in the first space and generating corresponding tracked motion data. The method further includes generating, using the tracked motion data, robot control information for controlling a robot to move a physical stop motion animation camera in a 3D or 2D stop motion animation set. The method further includes controlling, using the robot control information, the robot to move the stop motion animation camera in the 3D or 2D stop motion animation set.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for producing realistic camera motion for stop motion animation. One method includes tracking an object that is moved realistically by a human or other living organism, either with or without an associated rig and then using the tracked movement to define a continuous motion path for a stop motion animation camera in a 3D stop motion animation scene.

Figure 1:
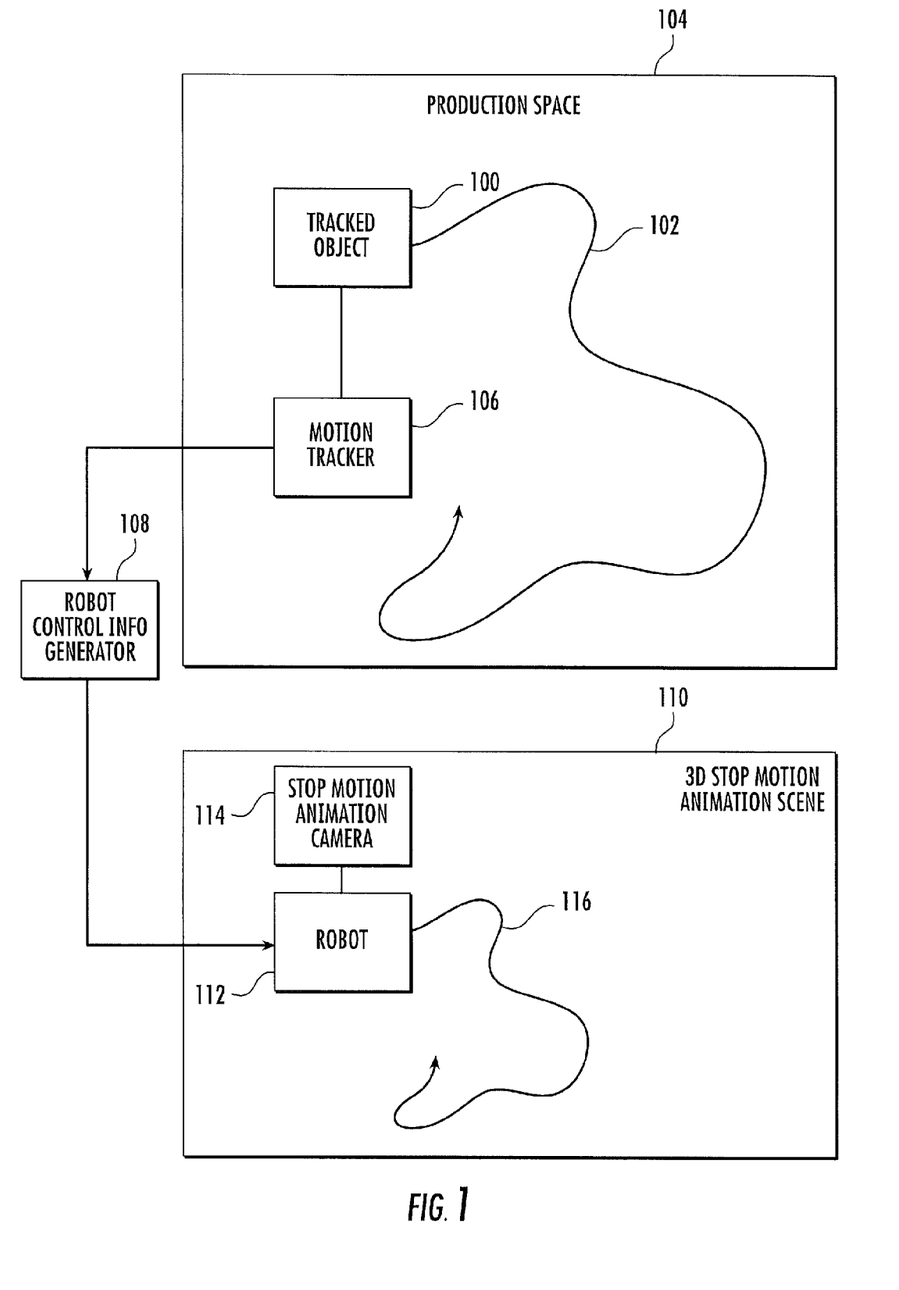
FIG. 1 is a block diagram illustrating an exemplary system for producing realistic camera motion for stop motion animation according to an embodiment of the subject matter described herein.

FIG. 1 is a block diagram illustrating an exemplary system for producing realistic camera motion for stop motion animation according to an embodiment of the subject matter described herein. Referring to FIG. 1, a tracked object 100 may be moved along a path indicated by trajectory arrow 102 in a production space 104. A motion tracker 106 may track motion of object 100. In one example, tracked object 100 is the same camera that is subsequently used to capture images used for stop motion animation. In another example, tracked object 100 may be a proxy for the camera. The proxy may be a user's head, a dog's head, a bird's head, a small model of a car, or even a block of wood.

Although in the example illustrated in FIG. 1, the motion of object 100 is illustrated in two dimensions, it is understood that object 100 may move in three dimensions, and motion of object 100 may be tracked in three dimensions. In addition, tracking the motion of object 100 includes tracking not only changes in position but also changes in rotation of object 100 over time.

Motion tracker 106 can be any suitable device or software executed by a processor that is capable of tracking motion of an object. In one example, motion tracker 106 comprises camera solving software that uses photogrammetric methods to extract a motion path of a camera from images captured by the camera. In another example, motion tracker 106 may be a physical tracker external to tracked object 100 that tracks object 100 using optical or electromagnetic sensors. In another example, motion tracker 106 may include an infrared sensor that tracks infrared light sources located on tracked object 100. In another example, motion tracker 106 may be an electromagnetic tracker that is attached to tracked object 100. Motion tracker 106 may also be a global positioning system (GPS) chip located on tracked object 100 that tracks motion of object 100 using GPS satellite signals.

Once motion of object 100 is tracked over a desired trajectory 102, the tracked motion data is provided to a robot control information generator 108. Robot control information generator 108 may scale and manipulate the tracked motion data to fit the scale of a 3D stop motion animation scene 110. If production space 104 and 3D stop motion animation set or scene 110 are the same space or equal in volume, no scaling or a one-to-one scaling may be performed. However, if production space 104 is different in scale than 3D stop motion animation scene 110, robot control information generator 108 may scale motion path 102 to fit the scale of 3D stop motion animation scene 110. For example, if production space 104 is ten times the size of scene 110, robot control information generator 108 may scale the movements by $1/10^{th}$. Robot control information generator 108 may also define or receive as input from the animator a start point for the motion in scene 110. Once the start point is defined and the scaling is performed, robot control information generator 108 generates instructions in a format compatible with the motion control systems of a robot 112 for controlling a robot 112 to move stop motion animation camera 114 around 3D stop motion animation scene 110 according to the scaled trajectory 116. Because the original trajectory was produced by a human or other living organism continuously moving object 100, movement of camera 114 around scene 110 will appear more realistic than conventional methods where computer-interpolated data and/or tracks are used to control motion of robot 112.

In one example, robot control information generator 108 may receive as input the tracked motion data of object 100, a desired scale for the stop motion animation scene, a desired rotation order of the robot, and a desired camera orientation for the stop motion animation scene. In response to receiving the input, robot control information generator 108 may automatically generate the robot control information in a format compatible with the motion control systems of robot 112. An example of such robot control information is presented below.

Figure 2:
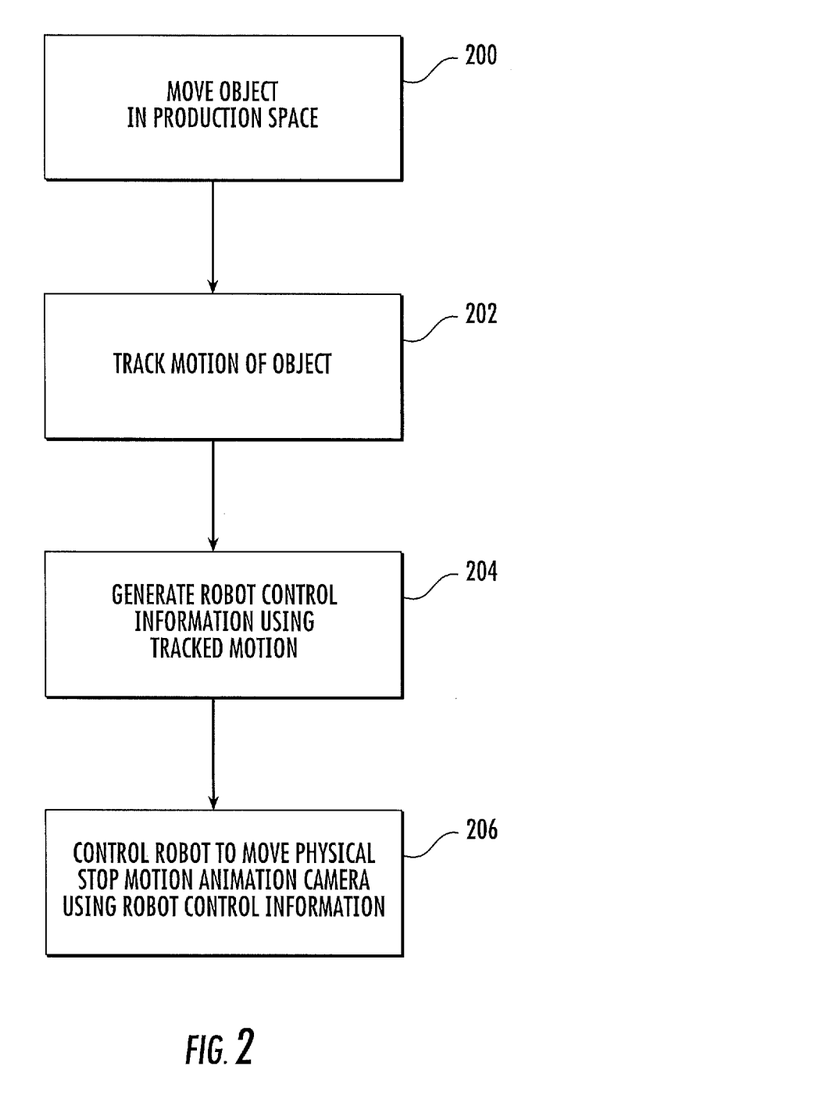
FIG. 2 is a flow chart illustrating an exemplary process for producing realistic camera motion for stop motion animation according to an embodiment of the subject matter described herein.

FIG. 2 is a flow chart illustrating an example process for creating realistic camera motion for stop motion animation according to an embodiment of the subject matter described herein. Referring to FIG. 2, in step 200, an object is moved in a production space. For example, tracked object 100 may be moved in production space 104. Production space 104 may be the same space as 3D stop motion animation scene 110 or a physically separate space. Tracked object 100 may be any of the objects described above, including, but not limited to, stop motion animation camera 114 on a proxy for stop motion animation camera 114. The motion may be effected by a human or other living organism. In step 202, motion of the object is tracked. The tracking may be performed using a sensor that is internal or external to tracked object 100. Tracking the motion may include tracking changes in position and rotation of object 100 over time. Tracking the motion may also or alternately include tracking magnitude and direction of velocity and/or acceleration of object 100. If object 100 is the stop motion animation camera and the tracking space is the stop motion animation set, additional attributes of the camera can be tracked in this step—such as the exposure light reading of the camera and/or a depth reading of an auto- or manual focus lens. These additional tracks of data captured during the performance (step 202) could later be used to modulate the focus and exposure settings of the camera when capturing the stop motion animation.

In step 204, robot control information is generated using the tracked motion. Generating the robot control information may include performing any needed scaling, re-orienting, and offsetting of the tracked position and rotation of camera 114 to match that of the 3D stop motion animation scene. Generating the robot control information may also include changing the rotation order to match the rotation order required by the particular robot to achieve the tracked rotation performed by the human user. In step 206, the robot is controlled to move the physical stop motion animation camera using the robot control information. For example, the robot control information may be loaded into the motion control system of robot 112. The robot control information controls robot 112 to move along trajectory 116. The motion along trajectory 116 is stopped at predetermined frame increments to allow the animator to move objects in the scene.

As stated above, in one example, camera motion is extracted using camera solving or motion extraction software. One example of such software is MATCHMOVER available from Autodesk, Inc. Table 1 shown below illustrates an example of one second of camera motion captured by MATCHMOVER.

TABLE 1

| | Captured Camera Motion | | | | | |
|---|---|---|---|---|---|---|
| Frame Number | Translate X Capture | Translate Y Capture | Translate Z Capture | Rotate X Capture | Rotate Y Capture | Rotate Z Capture |
| 1 | 1.51822 | 6.98693 | 21.9925 | 0 | 0 | 0 |
| 2 | 1.51819 | 6.98695 | 21.9925 | −0.00012548 | −0.000158157 | 0.000130626 |
| 3 | 1.51775 | 6.98617 | 21.9935 | −0.00099043 | 0.0435111 | −0.0164032 |
| 4 | 1.51864 | 6.98293 | 21.9922 | −0.0180888 | 0.0969147 | −0.0513847 |
| 5 | 1.52065 | 6.98088 | 21.9903 | −0.0406112 | 0.143343 | −0.0434899 |

TABLE 1-continued

Captured Camera Motion

| Frame Number | Translate X Capture | Translate Y Capture | Translate Z Capture | Rotate X Capture | Rotate Y Capture | Rotate Z Capture |
|---|---|---|---|---|---|---|
| 6 | 1.52184 | 6.97869 | 21.9875 | −0.0620602 | 0.175052 | −0.0111895 |
| 7 | 1.5217 | 6.97688 | 21.9846 | −0.0790081 | 0.197778 | 0.0159696 |
| 8 | 1.52308 | 6.97224 | 21.9821 | −0.0973153 | 0.213359 | 0.0803675 |
| 9 | 1.52239 | 6.96758 | 21.9802 | −0.13454 | 0.208009 | 0.146125 |
| 10 | 1.52358 | 6.96768 | 21.9743 | −0.193043 | 0.20778 | 0.148412 |
| 11 | 1.52621 | 6.97148 | 21.9662 | −0.230347 | 0.20513 | 0.191065 |
| 12 | 1.52881 | 6.97575 | 21.9593 | −0.221227 | 0.205627 | 0.272883 |
| 13 | 1.52817 | 6.97972 | 21.9554 | −0.189317 | 0.193201 | 0.370877 |
| 14 | 1.52641 | 6.98426 | 21.9557 | −0.15396 | 0.178313 | 0.41027 |
| 15 | 1.52714 | 6.98394 | 21.9556 | −0.144513 | 0.167236 | 0.377042 |
| 16 | 1.528 | 6.98376 | 21.9526 | −0.165247 | 0.155722 | 0.320997 |
| 17 | 1.53201 | 6.98586 | 21.9471 | −0.19702 | 0.149544 | 0.273762 |
| 18 | 1.53432 | 6.98562 | 21.9429 | −0.224757 | 0.13868 | 0.246013 |
| 19 | 1.53862 | 6.98679 | 21.9346 | −0.259882 | 0.137405 | 0.255326 |
| 20 | 1.53864 | 6.98571 | 21.9289 | −0.281075 | 0.125566 | 0.30116 |
| 21 | 1.53903 | 6.98442 | 21.9236 | −0.308124 | 0.126808 | 0.319056 |
| 22 | 1.53926 | 6.98265 | 21.9188 | −0.356386 | 0.1333 | 0.300551 |
| 23 | 1.54036 | 6.98264 | 21.9117 | −0.397069 | 0.155806 | 0.291221 |
| 24 | 1.53932 | 6.98204 | 21.9054 | −0.434795 | 0.180153 | 0.291032 |

In Table 1, the tracked camera motion includes x, y, and z translations and x, y and z rotations for each frame. The rotations and translations are shown in centimeters. Thus, between frame number 1 and frame number 2, the tracked camera moves 1.51819−1.51822=−0.00003 cm or 0.00003 cm in the negative x direction.

Figure 4:
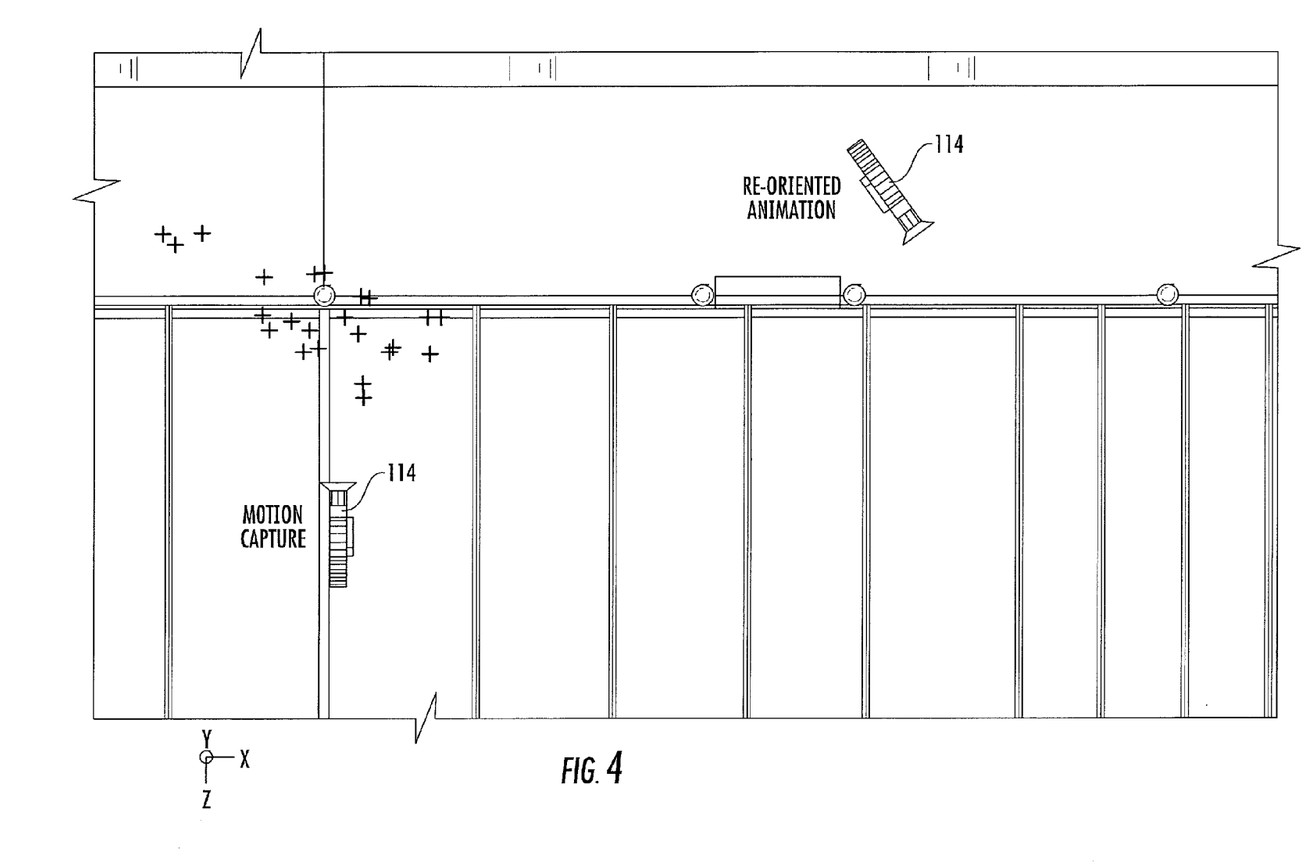
FIG. 4 is a top view illustrating an exemplary transformation of camera motion from a tracking space to a scene acquisition space according to an embodiment of the subject matter and described herein.

Once the camera motion tracking data is obtained, as stated above, the tracked motion data is scaled to match the scale of the 3D stop motion animation scene and to match the rotation order of the robot. The camera orientation may also be changed from the orientation used during motion tracking so that the camera will face the correct direction in the 3D stop motion animation scene. Table 2 shown below illustrates camera motion from Table 1 that is scaled down by a factor of 13.12% and where the rotation order is changed from x, y, z to y, z, and x to match the rotation order of a particular robot. In Table 2, the camera motion is millimeters. In addition, the camera has been rotated about the y axis so that the camera will be pointing in the correct direction in the 3D stop motion animation scene. This rotation changes the x and z translation dimensions. In FIG. 4, the portion of the figure labeled "Motion Capture" illustrates the camera orientation during the camera motion capture stage. The portion of the figure labeled "Reoriented Animation" illustrates a previsualization of the reorientation and repositioning of the camera for image acquisition in preparation for the stop motion animation.

TABLE 2

Scaled, Offset Camera Motion

| Frame Number | Translate X Output | Translate Y Output | Translate Z Output | Rotate X Output | Rotate Y Output | Rotate Z Output |
|---|---|---|---|---|---|---|
| 1 | −122.6109697 | −177.7004735 | 671.1429371 | 0 | −145.1024779 | 0 |
| 2 | −122.6112632 | −177.7008156 | 671.143358 | 0.00012548 | −145.102636 | 0.000130626 |
| 3 | −122.6295982 | −177.6874737 | 671.1397448 | 0.000977973 | −145.0589665 | −0.016403195 |
| 4 | −122.6026508 | −177.6320535 | 671.1399806 | 0.018001877 | −145.005547 | −0.051384629 |
| 5 | −122.5563258 | −177.5969883 | 671.1303754 | 0.040502385 | −144.9591041 | −0.043489775 |
| 6 | −122.505399 | −177.5595284 | 671.1410814 | 0.062026012 | −144.9274138 | −0.011189454 |
| 7 | −122.4660846 | −177.5285684 | 671.1714247 | 0.079063222 | −144.9047219 | 0.01596952 |
| 8 | −122.4175072 | −177.4492012 | 671.1765294 | 0.097614477 | −144.8892556 | 0.080367059 |
| 9 | −122.3976042 | −177.369492 | 671.2048028 | 0.135070059 | −144.8948127 | 0.146124443 |
| 10 | −122.3031872 | −177.3712025 | 671.2458452 | 0.193580559 | −144.8951986 | 0.148411871 |
| 11 | −122.1638144 | −177.4362014 | 671.2882147 | 0.231029766 | −144.8981172 | 0.191065329 |
| 12 | −122.0415701 | −177.5092397 | 671.319262 | 0.222203826 | −144.8979069 | 0.272883295 |
| 13 | −121.9931196 | −177.5771465 | 671.3664058 | 0.190563618 | −144.9105064 | 0.370876943 |
| 14 | −122.0145516 | −177.6249122 | 671.3881613 | 0.155232861 | −144.9252719 | 0.410269519 |
| 15 | −122.0060049 | −177.6493296 | 671.3788986 | 0.145610379 | −144.9361965 | 0.377041612 |
| 16 | −121.9555017 | −177.6462507 | 671.3961914 | 0.166116827 | −144.9476841 | 0.320997164 |
| 17 | −121.8390999 | −177.661581 | 671.3937574 | 0.197732276 | −144.953877 | 0.273762698 |
| 18 | −121.7575721 | −177.6780659 | 671.4024511 | 0.225350381 | −144.9647642 | 0.246014182 |
| 19 | −121.599051 | −177.679413 | 671.4233492 | 0.260491732 | −144.9662324 | 0.255327905 |
| 20 | −121.5188893 | −177.6796054 | 671.4788485 | 0.281731118 | −144.978391 | 0.301162918 |
| 21 | −121.4407185 | −177.65754 | 671.5252426 | 0.308625359 | −144.9773877 | 0.319059853 |
| 22 | −121.371128 | −177.6272641 | 671.5689885 | 0.357080332 | −144.9710492 | 0.300556024 |
| 23 | −121.2607568 | −177.6270931 | 671.6230366 | 0.397855792 | −144.9486921 | 0.291226944 |
| 24 | −121.1825508 | −177.6168301 | 671.6992783 | 0.435704467 | −144.9245358 | 0.291038977 |

Once the tracked camera motion is scaled and the rotation order is modified, the robot control information may be generated in a format compatible with a control system of a robot. The following illustrates exemplary robot control information generated in a format compatible with DRAGONFRAME stop motion animation software available from DZED Systems, LLC.

```xml
<? xml version="1.0" encoding="UTF-8"?>
<scen:scene fps="23.976" endFrame="24" cameraOperator=""
xmlns:scene="orthoc">
<scen:axis stepsPerUnit="2519.68" preset="" connectionType="1" integral="false"
pulseRate="3000" units="mm" connectionChannel="2" limitMin="-240"
limitMax="240" graphSolo="false" backlashRollback="3" name="Trans_X" base="0"
graphColor="-13395457" viewPosition="10" settleTime="1.2">
<scen:points type="5" x="1" y="-122.6109697"/>
<scen:points type="5" x="2" y="-122.6112632"/>
<scen:points type="5" x="3" y="-122.6295982"/>
<scen:points type="5" x="4" y="-122.6026508"/>
<scen:points type="5" x="5" y="-122.5563258"/>
<scen:points type="5" x="6" y="-122.505399"/>
<scen:points type="5" x="7" y="-122.4660846"/>
<scen:points type="5" x="8" y="-122.4175072"/>
<scen:points type="5" x="9" y="-122.3976042"/>
<scen:points type="5" x="10" y="-122.3031872"/>
<scen:points type="5" x="11" y="-122.1638144"/>
<scen:points type="5" x="12" y="-122.0415701"/>
<scen:points type="5" x="13" y="-121.9931196"/>
<scen:points type="5" x="14" y="-122.0145516"/>
<scen:points type="5" x="15" y="-122.0060049"/>
<scen:points type="5" x="16" y="-121.9555017"/>
<scen:points type="5" x="17" y="-121.8390999"/>
<scen:points type="5" x="18" y="-121.7575721"/>
<scen:points type="5" x="19" y="-121.599051"/>
<scen:points type="5" x="20" y="-121.5188893"/>
<scen:points type="5" x="21" y="-121.4407185"/>
<scen:points type="5" x="22" y="-121.371128"/>
<scen:points type="5" x="23" y="-121.2607568"/>
<scen:points type="5" x="24" y="-121.1825508"/>
</scen:axis>
<scen:axis stepsPerUnit="2519.68" preset="" connectionType="1" integral="false"
pulseRate="3000" units="mm" connectionChannel="3" limitMax="60"
graphSolo="false" backlashRollback="3" name="Trans_Y" base="0" graphColor=
"-16738048" viewPosition="20" settleTime="1.2">
<scen:points type="5" x="1" y="-177.7004735"/>
<scen:points type="5" x="2" y="-177.7008156"/>
<scen:points type="5" x="3" y="-177.6874737"/>
<scen:points type="5" x="4" y="-177.6320535"/>
<scen:points type="5" x="5" y="-177.5969883"/>
<scen:points type="5" x="6" y="-177.5595284"/>
<scen:points type="5" x="7" y="-177.5285684"/>
<scen:points type="5" x="8" y="-177.4492012"/>
<scen:points type="5" x="9" y="-177.369492"/>
<scen:points type="5" x="10" y="-177.3712025"/>
<scen:points type="5" x="11" y="-177.4362014"/>
<scen:points type="5" x="12" y="-177.5092397"/>
<scen:points type="5" x="13" y="-177.5771465"/>
<scen:points type="5" x="14" y="-177.6249122"/>
<scen:points type="5" x="15" y="-177.6493296"/>
<scen:points type="5" x="16" y="-177.6462507"/>
<scen:points type="5" x="17" y="-177.661581"/>
<scen:points type="5" x="18" y="-177.6780659"/>
<scen:points type="5" x="19" y="-177.679413"/>
<scen:points type="5" x="20" y="-177.6796054"/>
<scen:points type="5" x="21" y="-177.65754"/>
<scen:points type="5" x="22" y="-177.6272641"/>
<scen:points type="5" x="23" y="-177.6270931"/>
<scen:points type="5" x="24" y="-177.6168301"/>
</scen:axis>
<scen:axis stepsPerUnit="-500" preset="" connectionType="1" integral="false"
pulseRate="3000" units="mm" connectionChannel="1" graphSolo="false"
backlashRollback="3" name="Trans_Z" base="0" graphColor="-65485"
viewPosition="10" settleTime="1.2">
<scen:points type="5" x="1" y="671.1429371"/>
<scen:points type="5" x="2" y="671.143358"/>
<scen:points type="5" x="3" y="671.1397448"/>
<scen:points type="5" x="4" y="671.1399806"/>
<scen:points type="5" x="5" y="671.1303754"/>
<scen:points type="5" x="6" y="671.1410814"/>
<scen:points type="5" x="7" y="671.1714247"/>
<scen:points type="5" x="8" y="671.1765294"/>
<scen:points type="5" x="9" y="671.2048028"/>
<scen:points type="5" x="10" y="671.2458452"/>
```

```
<scen:points type="5" x="11" y="671.2882147"/>
<scen:points type="5" x="12" y="671.319262"/>
<scen:points type="5" x="13" y="671.3664058"/>
<scen:points type="5" x="14" y="671.3881613"/>
<scen:points type="5" x="15" y="671.3788986"/>
<scen:points type="5" x="16" y="671.3961914"/>
<scen:points type="5" x="17" y="671.3937574"/>
<scen:points type="5" x="18" y="671.4024511"/>
<scen:points type="5" x="19" y="671.4233492"/>
<scen:points type="5" x="20" y="671.4788485"/>
<scen:points type="5" x="21" y="671.5252426"/>
<scen:points type="5" x="22" y="671.5689885"/>
<scen:points type="5" x="23" y="671.6230366"/>
<scen:points type="5" x="24" y="671.6992783"/>
</scen:axis>
<scen:axis stepsPerUnit="1280" preset="" connectionType="1" integral="false"
pulseRate="3000" units="deg" connectionChannel="6" homePosition="232.668249"
graphSolo="false" backlashRollback="2" name="Rot_X" base="0" graphColor=
"-26368" viewPosition="30" settleTime="1.2">
<scen:points type="5" x="1" y="-0"/>
<scen:points type="5" x="2" y="0.0001254796394"/>
<scen:points type="5" x="3" y="0.0009779731746"/>
<scen:points type="5" x="4" y="0.01800187656"/>
<scen:points type="5" x="5" y="0.04050238508"/>
<scen:points type="5" x="6" y="0.06202601233"/>
<scen:points type="5" x="7" y="0.07906322192"/>
<scen:points type="5" x="8" y="0.09761447734"/>
<scen:points type="5" x="9" y="0.135070059"/>
<scen:points type="5" x="10" y="0.1935805586"/>
<scen:points type="5" x="11" y="0.2310297663"/>
<scen:points type="5" x="12" y="0.2222038262"/>
<scen:points type="5" x="13" y="0.1905636176"/>
<scen:points type="5" x="14" y="0.1552328614"/>
<scen:points type="5" x="15" y="0.1456103788"/>
<scen:points type="5" x="16" y="0.1661168265"/>
<scen:points type="5" x="17" y="0.197732276"/>
<scen:points type="5" x="18" y="0.2253503812"/>
<scen:points type="5" x="19" y="0.260491732"/>
<scen:points type="5" x="20" y="0.2817311179"/>
<scen:points type="5" x="21" y="0.3088253586"/>
<scen:points type="5" x="22" y="0.357080332"/>
<scen:points type="5" x="23" y="0.3978557919"/>
<scen:points type="5" x="24" y="0.4357044666"/>
</scen:axis>
<scen:axis stepsPerUnit="1280" preset="" connectionType="1" integral="false"
pulseRate="3000" units="deg" connectionChannel="4" graphSolo="false"
backlashRollback="2" name="Rot_Z" base="0" graphColor="-29976"
viewPosition="40" settleTime="1.2">
<scen:points type="5" x="1" y="0"/>
<scen:points type="5" x="2" y="0.000130626"/>
<scen:points type="5" x="3" y="-0.016403195"/>
<scen:points type="5" x="4" y="-0.051384629"/>
<scen:points type="5" x="5" y="-0.043489775"/>
<scen:points type="5" x="6" y="-0.011189454"/>
<scen:points type="5" x="7" y="0.01596952"/>
<scen:points type="5" x="8" y="0.080367059"/>
<scen:points type="5" x="9" y="0.146124443"/>
<scen:points type="5" x="10" y="0.148411871"/>
<scen:points type="5" x="11" y="0.191065329"/>
<scen:points type="5" x="12" y="0.272883295"/>
<scen:points type="5" x="13" y="0.370876943"/>
<scen:points type="5" x="14" y="0.410269519"/>
<scen:points type="5" x="15" y="0.377041612"/>
<scen:points type="5" x="16" y="0.320997164"/>
<scen:points type="5" x="17" y="0.273762698"/>
<scen:points type="5" x="18" y="0.246014182"/>
<scen:points type="5" x="19" y="0.255327905"/>
<scen:points type="5" x="20" y="0.301162918"/>
<scen:points type="5" x="21" y="0.319059853"/>
<scen:points type="5" x="22" y="0.300556024"/>
<scen:points type="5" x="23" y="0.291226944"/>
<scen:points type="5" x="24" y="0.291038977"/>
</scen:axis>
</scen:scene>
```

In the code example, the format of the data is ARCmotion. Such a format imports directly into the DRAGONFRAME software, which can be used to control a robot that moves stop motion animation camera. In order to generate this format, robot control information generator 108 receives as input the position and rotation data in Table 2 along with the scale factor, robot rotation order, and camera orientation for the stop motion animation scene. Robot control information generator 108 may then generate robot control information in ARCmotion format. Robot control information generator 108 allows the user to visualize the motion of a captured data and reposition this motion path within a virtual model of the physical set. The motion path may be post-processed in this stage to create different effects (for example the captured data may be scaled in time, rotated, scaled or offset in space, or filtered to achieve a smoother path). Once the movement of the virtual camera in the virtual set has been finalized, robot control information generator 108 steps through each frame of the animation and records the new position and rotation of the camera and embeds these measurements as a program of movement for each axis within the Extensible Markup Language (XML) ARCmotion format. In one implementation, robot control information generator is scripted in Maya Embedded Language (MEL), which runs in Maya, the current industry standard for 3D computer animation. However, robot control information generator 108 may be written in any suitable programming language without departing from the scope of the subject matter described herein.

Figure 3:
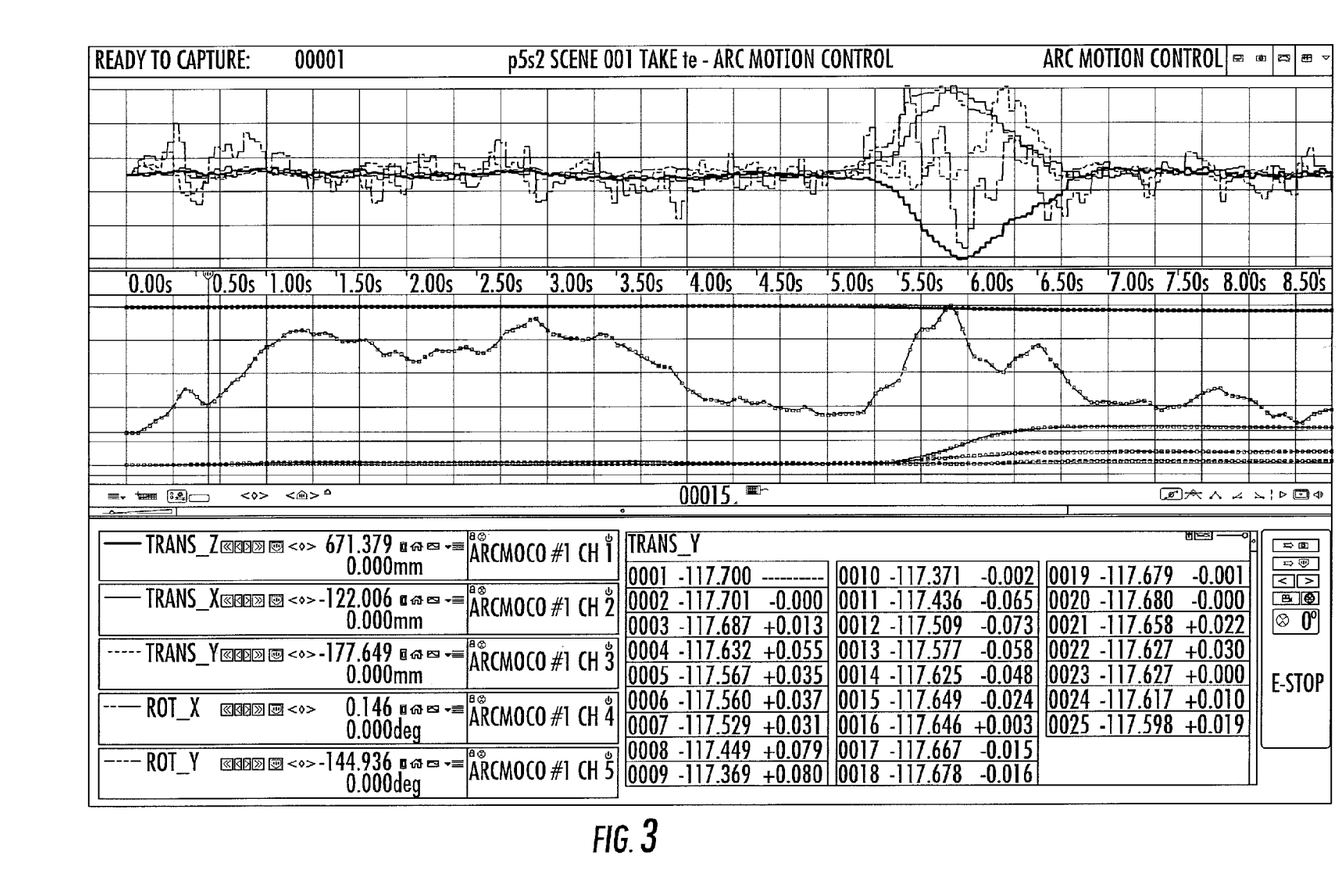
FIG. 3 is a line drawing of computer screen shot illustrating movement of a camera around a 3D stop motion animation scene tracked position and rotation of the camera according of an embodiment of the subject matter described herein.

FIG. 3 is a drawing of a computer screen shot illustrating the tracked and transformed motion within the DRAGONFRAME Stop Motion software. In FIG. 3, the top pane is a graph of the velocity of the camera about different axes between each captured frame. The center pane is a graph of rotation and translation values for each frame. The bottom pane shows data values for the current and subsequent frames for each axis. As illustrated in the upper and middle pane, realistic camera motion can be erratic in both its change of angular and positional velocity and also in its approach to an ultimate trajectory. Such motion is tracked and then used to control the stop motion animation robot, which moves the camera step by step during stop motion animation. Motion based on tracked motion produced by a human or other living organism can be contrasted with conventional camera motion for stop motion animation where software generates arcs or linear transitions between designated keyframes.

Thus, using the subject matter described herein, realistic camera motion can be captured and used to generate robot control information useful for moving a robot that moves a stop motion animation camera while the camera is acquiring images in a 3D stop motion animation scene. When the robot is programmed to effect such realistic camera movement, the robot becomes a particular machine that improves the technological field of 3D stop motion animation over systems where robot control information is generated exclusively by defining key positions in software or through the use of motion control systems that incorporate indirect control by input devices such as handwheel or joystick interfaces.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method for producing realistic camera motion for stop motion animation, the method comprising:
moving an object in a first space, wherein at least a portion of the movement is effected by a human or other living organism, wherein the first space comprises a production space for stop motion animation and wherein the object comprises a stop motion animation camera or a physical proxy for the stop motion animation camera;
tracking, using a hardware processor, motion of the object as the object is moved in the first space and generating corresponding tracked motion data;
generating, using the tracked motion data, robot control information for controlling a robot to move the stop motion animation camera in a stop motion animation set;
controlling, using the robot control information, the robot to move the stop motion animation camera in the stop motion animation set; and
while the stop motion animation camera is being moved using the robot control information, acquiring images using the stop motion animation camera in the stop motion animation set.

2. The method of claim 1 wherein moving the object includes moving the object in free space using a body of the human or other living organism or using a rig designed to hold the object.

3. The method of claim 1 wherein the production space is separate from the stop motion animation set.

4. The method of claim 1 wherein the production space comprises the stop motion animation set.

5. The method of claim 1 wherein tracking motion of the object includes tracking position and rotation of the object or derivatives thereof using sensors.

6. The method of claim 1 wherein the object comprises the stop motion animation camera and wherein tracking motion of the object includes extracting the motion of the stop motion animation camera using images captured by the stop motion animation camera during motion of the stop motion animation camera in the first space.

7. The method of claim 1 wherein generating the robot control information includes mirroring the tracked motion or changing at least one of scale, starting point, camera orientation and rotation order obtained from the tracked motion.

8. The method of claim 1 wherein generating the robot control information includes generating a set of instructions compatible with a control system of the robot to control the robot to move the stop motion animation camera in the stop motion animation set.

9. The method of claim 1 wherein controlling the robot includes controlling the robot to move the stop motion animation camera around the set in frame by frame increments as an animator executes stop motion animation in front of the camera.

10. The method of claim 1 wherein generating the robot control information includes changing a rotation order from a rotation order of the tracked motion of the stop motion animation camera or the physical proxy for the stop motion animation camera to a rotation order that matches a rotation order for the robot.

11. A system for producing realistic camera motion for stop motion animation, the system comprising:
an object for moving in a first space, wherein at least a portion of the movement is effected by a human or other living organism, wherein the first space comprises a production space for stop motion animation and wherein the object comprises a stop motion animation camera or a physical proxy for the stop motion animation camera;
a hardware processor;
a tracker executed by the hardware processor for tracking motion of the object as the object is moved in the first space and generating corresponding tracked motion data; and a robot control information generator for generating, using the tracked motion data, robot control information for controlling a robot to move the stop motion animation camera in a stop motion animation set, wherein the stop motion animation camera acquires images in the stop motion animation set while being moved by the robot using the robot control information.

12. The system of claim 11 wherein the production space comprises the stop motion animation set.

13. The system of claim 11 wherein the production space comprises the stop motion animation set.

14. The system of claim 11 wherein the tracker includes at least one sensor for tracking motion of the object includes tracking position and rotation of the object or derivatives thereof.

15. The system of claim 11 wherein the object comprises the stop motion animation camera and wherein the tracker is configured to extract the motion of the stop motion animation camera using images captured by the stop motion animation camera during motion of the stop motion animation camera in the first space.

16. The system of claim 11 wherein the robot control information generator is configured to mirror the tracked motion or change at least one of scale, starting camera orientation position, and rotation order from the tracked motion.

17. The system of claim 11 wherein the robot control information generator is configured to generate a set of instructions compatible with a control system of the robot to control the robot to move the stop motion animation camera in the stop motion animation set.

18. The system of claim 11 wherein generating the robot control information includes changing a rotation order from a rotation order of the tracked motion of the stop motion animation camera or the physical proxy for the stop motion animation camera to a rotation order that matches a rotation order for the robot.

19. A non-transitory computer readable medium having stored thereon executable instructions that when executed by the hardware processor of a computer control the computer to perform steps comprising:

tracking motion of the object as the object is moved in a first space by a human or other living organism and generating corresponding tracked motion data, wherein the first space comprises a production space for stop motion animation and wherein the object comprises a stop motion animation camera or a physical proxy for the stop motion animation camera;

generating, using the tracked motion data, robot control information for controlling a robot to move a physical stop motion animation camera in a stop motion animation set;

controlling, using the robot control information, the robot to move the stop motion animation camera in the stop motion animation set; and while the stop motion animation camera is being moved using the robot control information, acquiring images using the stop motion animation camera in the stop motion animation set.

20. The non-transitory computer readable medium of claim 19 wherein generating the robot control information includes changing a rotation order from a rotation order of the tracked motion of the stop motion animation camera or the physical proxy for the stop motion animation camera to a rotation order that matches a rotation order for the robot.

* * * * *